(12) United States Patent
Sfanos et al.

(10) Patent No.: US 9,355,180 B2
(45) Date of Patent: May 31, 2016

(54) NAME-BASED CUSTOMIZATION OF EXECUTABLES FROM WEB

(75) Inventors: Christopher Michael Sfanos, Issaquah, WA (US); Madhur Joshi, Kirkland, WA (US); Satish Lalam, Redmond, WA (US); Andrew Philip Birck, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 985 days.

(21) Appl. No.: 13/022,581

(22) Filed: Feb. 7, 2011

(65) Prior Publication Data

US 2012/0203930 A1 Aug. 9, 2012

(51) Int. Cl.
*G06F 15/173* (2006.01)
*G06F 17/30* (2006.01)
*G06F 9/445* (2006.01)

(52) U.S. Cl.
CPC ...... *G06F 17/30867* (2013.01); *G06F 9/44552* (2013.01); *G06F 17/30887* (2013.01)

(58) Field of Classification Search
USPC ............... 709/201–250, 200; 370/60–85; 705/3–20
See application file for complete search history.

(56) References Cited

U.S. PATENT DOCUMENTS

| | | | |
|---|---|---|---|
| 6,272,673 B1 * | 8/2001 | Dale et al. | 717/100 |
| 7,073,165 B2 | 7/2006 | Hanson | |
| 7,203,769 B2 | 4/2007 | Schnier | |
| 2001/0056547 A1 * | 12/2001 | Dixon | 713/200 |
| 2002/0029244 A1 * | 3/2002 | Suzuki et al. | 709/203 |
| 2003/0131145 A1 | 7/2003 | Mcardle | |
| 2004/0107404 A1 | 6/2004 | Burns et al. | |
| 2004/0181598 A1 * | 9/2004 | Paya et al. | 709/227 |
| 2006/0095538 A1 | 5/2006 | Rehman et al. | |
| 2008/0127169 A1 * | 5/2008 | Malasky et al. | 717/174 |
| 2011/0055912 A1 * | 3/2011 | Fusari et al. | 726/8 |

OTHER PUBLICATIONS

Setting up page navigation, "Working with Web and JSP Targets-Writing Server Scripts", Oct. 26, 2010 (Retrieved Date) (6 pages).
Parsing parameters that were passed via the URL from one page to the next, Oct. 26, 2010 (Retrieved Date) (2 pages).
John Tabernik and Scott Mitchell, Passing Parameters from One Page to Another, Pub. Date: Feb. 2, 2005, (6 pages).

\* cited by examiner

*Primary Examiner* — El Hadji Sall
(74) *Attorney, Agent, or Firm* — Kevin Sullivan; Aaron Hoff; Micky Minhas

(57) ABSTRACT

The customized execution of an executable accessed from a web server. Upon receiving a request for the executable, the web server determines a customization to be applied to the executable. For instance, arguments may be parsed from the Uniform Resource Locator (URL) of the request. The web server then sends a copy of the executable to the client, and provides customization argument(s) in the name of the executable. Thus, the name of the executable may differ, depending on the customization to be applied, although the executable binary itself may be the same. The client receives the executable copy, and interprets its name to determine the customization to be applied. For instance, the client may extract the argument(s) from the name of the executable, and provide those argument(s) to the executable when executed.

20 Claims, 3 Drawing Sheets

NAME-BASED CUSTOMIZATION OF EXECUTABLES FROM WEB

BACKGROUND

A user may navigate the web by using a browser on a client computing system (i.e., a "client"). The browser displays web pages that each include selectable controls such as, for example, hyperlinks. Some hyperlinks navigate the browser to another web page. Other hyperlinks launch applications. Conventionally, when a user clicks a hyperlink on a web page to launch an application, the client requests an executable from a server. The server retrieves the executable file, and sends that executable to the client, which may then execute the executable file.

If a different application experience is to be generated, a different executable is generated at the server, and that executable may then be downloaded. Conventionally, command line arguments are not transferred to the application as part of the hyperlink-based application launch. This limits the ability of the application to be launched in a manner that is customized for the user or the scenario during execution.

BRIEF SUMMARY

At least one embodiment described herein relates to the customized execution of an executable accessed from a web server. Upon receiving a request for the executable, the web server determines a customization to be applied to the executable. For instance, arguments may be parsed from the Uniform Resource Locator (URL) of the request. The web server then sends a copy of the executable, and provides information representing customization argument(s) in the name of the executable. Thus, the name of the executable may differ, depending on the customization to be applied, although the executable binary itself may be the same for multiple customizations. The client receives the executable, and interprets its name to determine the customization to be applied. For instance, the client may extract the argument(s) from the name of the executable, and provide those argument(s) to the executable when executed.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the customized execution of an executable accessed from a web server is described. Upon receiving a request for the executable, the web server determines a customization to be applied to the executable. The web server then sends a copy of the executable, and provides information representing customization argument(s) in the name of the executable. Thus, the name of the executable may differ, depending on the customization to be applied, although the executable binary itself may be the same. The client receives the executable, and interprets its name to determine the customization to be applied. First, some introductory discussion regarding computing systems will be described with respect to FIG. 1. Then, the embodiments of the distributed caching network and its example operation will be described with respect to FIGS. 2 and 3.

Figure 1:
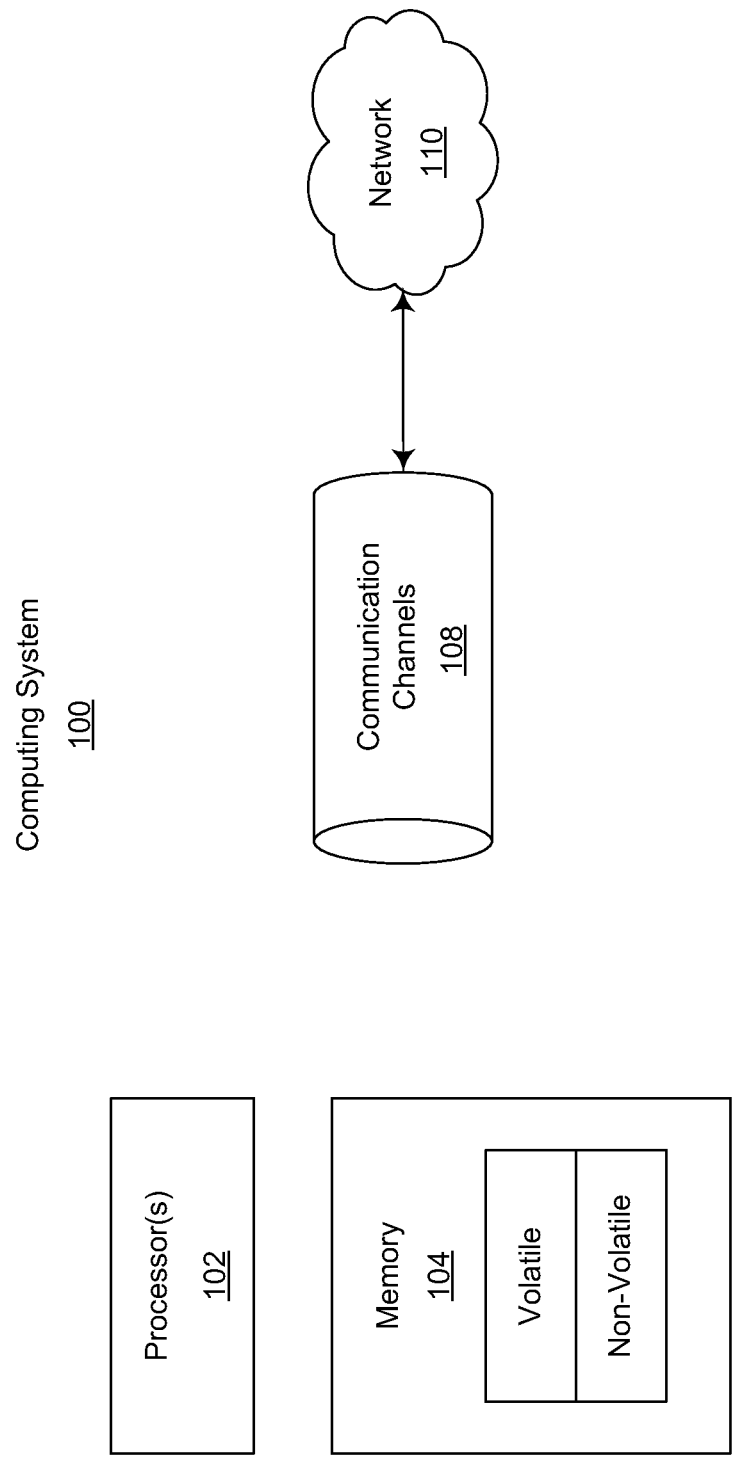
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
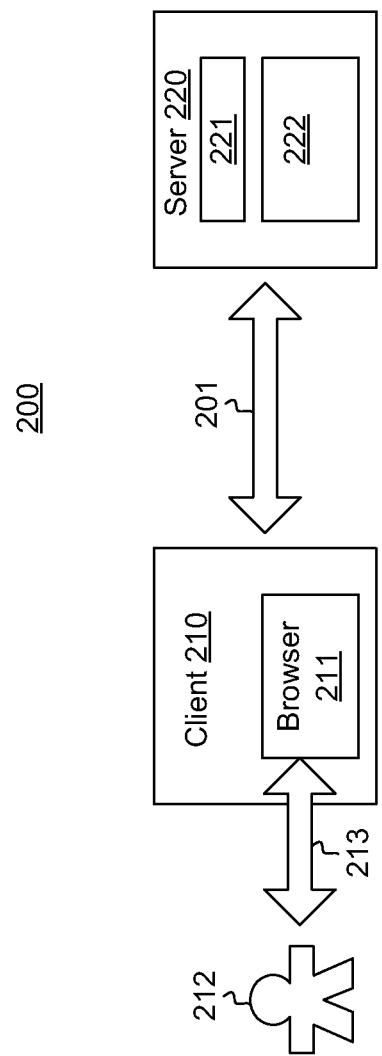
FIG. 2 illustrates a network environment in which a client communicates with a web server over a network, and represents an example environment in which the principles described herein may operate.

FIG. 2 illustrates a network environment 200 that includes a client 210 and a server 220. Each of the client 210 and the server 220 may be structured as described above for the computing system 100 of FIG. 1. Each of the client 210 and the server 220 may have access to a corresponding computer program product that includes one or more computers storage media having thereon computer-executable instructions that are structured such that, when executed by one or more processors of the computing system, the computing system is configured to perform the acts described further herein as attributable to the respective client 210 or web server 220.

For instance, the client 210 includes a browser 211 that a user 212 may interact with (as symbolized by bi-directional arrow 213) in order to navigate the web. The client 210 may interact with the web server 220 over a network (as represented by the bi-directional arrow 201) so as to support the web navigation experience. The web server 220 includes an executable 222. The logic component 221 responds to requests for executable components, and performs the other acts attributable to the web server and described further below.

Figure 3:
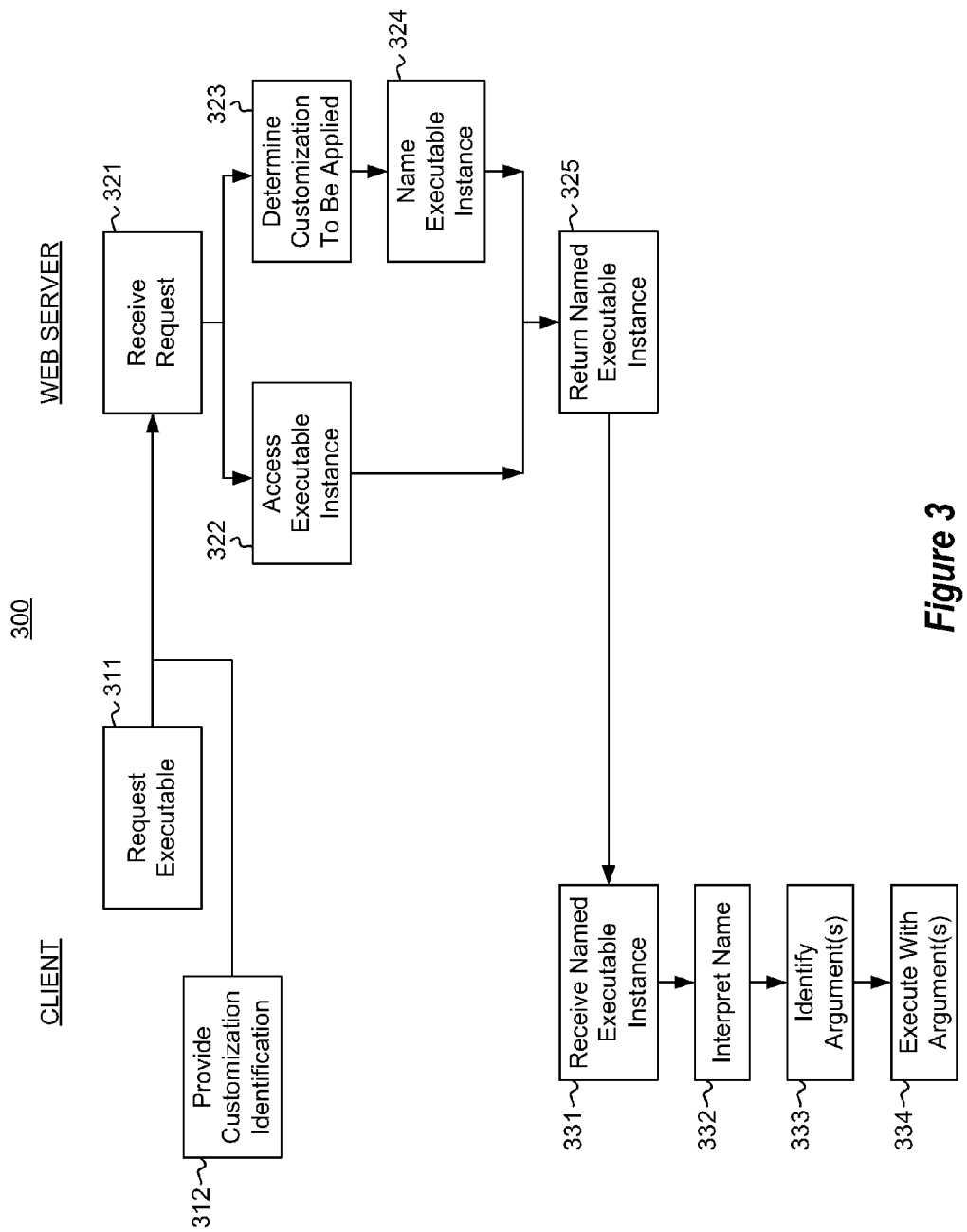
FIG. 3 illustrates a flowchart of a method for using the naming of a downloaded executable in order to customize execution of that executable at the client.

FIG. 3 illustrates a flowchart of a method 300 for customizing execution of an executable downloaded from a web server. In one embodiment, the customization is performed by the client 210 notifying the web server of the customization to be applied, perhaps in the form of providing argument(s) in a Uniform Resource Locator (URL). The web server then sends a copy of the executable 222 and names the executable instance in a way that the client 210 will be able to use the name to identify the argument(s) to be input to the instance as executed on the client. In one embodiment, the client 210 identifies the argument(s) by executing the executable 222 itself. In that case, the executable 222 may be structured so as to self-check its own name to identify arguments to be provided to itself. The method 300 of FIG. 3 may be performed in the context of the network environment 200 of FIG. 2. Accordingly, FIG. 3 will now be described with frequent reference to FIG. 2. Acts that are performed by the client are illustrated in the left half of FIG. 2 generally under the heading "Client", whereas acts that are performed by the web server are illustrated in the right half of FIG. 2 generally under the heading "Web Server".

The client initiates the method 300 by requesting an executable from the server (act 311). The executor may be, for example, an executable file. An example of an executable may be an installer application that, when executed, installs another executable application. As an example, and referring to FIG. 2, the user 212 may interact 213 with the browser 211 by selecting some type of control (such as a hyperlink) that causes the client 210 to issue the request for the executable.

The client also provides an identification of a customization to be applied to the executable by the web server (act 312). This act is optional as the web server may identify the customization in a way other than being notified by the client. For instance, the user 212 may have pre-registered with the server 220 to register preferences. This pre-registration may be part of the same web browser session with the server 220, or may be performed well in advance of the web browser session.

In one embodiment, the user is presented with multiple controls (e.g., multiple hyperlinks). Based on which of the controls is selected, the customization to be applied to the executable is identified. For instance, suppose that the user has navigated to an election results web site hosted by the web server 220. The user may be presented with multiple hyperlinks, one corresponding to each state. Depending on which state specific hyperlink is chosen, the web request may include argument(s) or other identification from which the web server 220 may identify a state customization associated with the executable to be downloaded. For instance, if the state is Washington state, then the election results might include federal election results, as well as the election results associated with the specific state. The executable might also seek out articles from state-specific sources to localize the presentation of news articles regarding the election. In one embodiment, the Uniform Resource Locator includes customization arguments.

Upon receiving the request from the client (act 321), the server accesses an instance of the executable (act 322) (in other words, the server copies the executable), and also determines a customization to be applied to the executable (act 323). Acts 322 and 323 are illustrated in parallel to emphasize that there is no executable order dependency between the two acts. For instance, referring to FIG. 2, the logic component 221 may access an instance of the executable 222. The logic component 221 may also examine the URL to identify the customization to be applied to the executable instance when executing. Alternatively, the logic component 221 may identify the user associated with the client 210 or may identify the client 210 itself, and access pre-registration information that allows the web server 220 to identify the customization to be applied based on the identity of the user and/or client. In one embodiment, the server copies the executable (act 322) as part of sending the executable (act 325), although that is not required.

The web server then names the executable instance (act 324) in a manner that is appropriate given the customization to be applied. For instance, referring to FIG. 2, the logic component 221 may apply a name to the executable instance, wherein at least some argument(s) to be applied to the executable instance (when executed) may be directly or indirectly identified from the name. This name may be included in a response header when sending the copy of the executable to the client.

The web server returns the named executable instance to the client (act 325). In one embodiment, when the request is received, the web server identifies the arguments to be provided and sends a copy of the executable with a header that includes the name of the executable copy. Note that if a subsequent request for the same executable is received, but in which a different customization is to be applied, the same executable binary would be returned in response to that request. However, the executable would have a different name to reflect the customization to be applied. Thus, rather than having to develop many different versions of the executable, a single version of the executable is all that is needed, with only the name applied to the executable instance changing in order to accommodate customization.

For instance, referring to FIG. 2, when a second request for the executable instance is received at the web server 220 (either from the client 210 or from a different client), the server sends a second copy of the executable, and names the second executable copy to corresponding to the second customization. Thus, the executable copies may have different names even though the executable binary is the same, with the different names being used to identify specific argument value(s) to be provided to the executable.

The client receives the requested executable instance from the web server (act 331), interprets a name of the requested executable instance (act 332), and uses the interpretation of the name to identify at least one argument to provide to the executable (act 333), and executes the executable instance with argument(s) (act 334). The executable receives the argument(s) and customizes execution accordingly. Again, the client may interpret the name of the requested executable instance in one embodiment by executing the executable itself, which may be structured to self-check its own name to identify the argument(s) to provide to itself.

For instance, in the election web site example, the executable binary may be simply an executable that presents federal election results, and has potential state data sources available, and logic to query the state data sources depending on the arguments provided to the executable. If the name of the executable were, for example, ElectionResultsWashington.exe, the client may interpret that the argument to be provided is "State=Washington", thus allowing the execution to know to access the data sources associated with Washington state.

Of course, this is just an example, the customization to be applied may be any customization. For instance, the customization may be a personal preference of the user, a localization customization, or any other customization. Thus, a mechanism for providing an executable with customization in a web navigation context is described in which a single executable may satisfy any customization.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer storage devices having thereon computer-executable instructions that are structured such that, when executed by one or more processors of a web server, cause the web server to perform a method for responding to a request for an executable from a client computing system, the method comprising:
   receiving from a client a request for an executable, the executable to be customized for execution at the client and the request including data which identifies a customization to be applied to the executable;
   determining from the data included in the request the customization to be applied to the executable copy at the client;
   naming the executable copy, the name corresponding to the customization to be applied to the executable instance at the client, and the name comprising at least one argument which will be applied to the executable upon execution at the client; and
   sending the named executable copy to the client, such that, upon execution at the client, the argument will be applied to the executable.

2. The computer program product in accordance with claim 1, wherein the request is a first request, the executable copy is a first executable copy, the customization is a first customization, and the client is a first client, the method further comprising:
   an act of receiving from a second client a second request for the executable;
   an act of determining a second customization to be applied to a second executable copy at the second client;

an act of naming the second executable copy, the name of the second executable copy corresponding to the second customization to be applied to the second executable copy at the second client; and an act of sending the named second executable copy to the second client.

3. The computer program product in accordance with claim 2, wherein the second executable instance has the same executable binary as the first executable instance.

4. The computer program product in accordance with claim 1, wherein the request is a first request, the executable instance is a first executable instance, and the customization is a first customization, the method further comprising:

an act of receiving from the client a second request for the executable;

an act of determining a second customization to be applied to a second executable copy at the client;

an act of naming the second executable instance, the name of the second executable copy corresponding to the second customization to be applied to the second executable copy at the client; and an act of sending the named second executable copy to the client.

5. The computer program product in accordance with claim 1, wherein the request was generated by a user of the client selecting a hyperlink.

6. The computer program product in accordance with claim 1, wherein the executable is an executable file.

7. The computer program product in accordance with claim 6, wherein the name corresponds to a parameter value to be provided to the executable file.

8. The computer program product in accordance with claim 1, wherein determining a customization to be applied to the executable copy at the client comprises:

determining the customization based on a hyperlink selected at the client to generate the request.

9. The computer program product in accordance with claim 1, wherein determining a customization to be applied to the executable copy at the client comprises:

determining the customization based on a prior registration associated with the client or a user of the client.

10. A computer program product comprising one or more computer storage devices having thereon computer-executable instructions that are structured such that, when executed by one or more processors of a client, cause the client to perform a method for accessing and executable a customized executable, the method comprising:

the client requesting an executable from a web server, the executable to be customized for execution at the client;

providing within the request an identification of a customization to be applied to the executable by the web server;

receiving the requested executable from the web server in response to the client requesting the executable, the executable having been provided with a name comprising at least one parameter which will be applied to the executable upon execution at the client in order to customize the executable for execution at the client;

interpreting the name of the requested executable; and using the interpretation of the name to identify the at least one parameter to provide to the executable.

11. The computer program product in accordance with claim 10, wherein the client requesting an executable from a web server is performed in response to a selection of a hyperlink at the client.

12. The computer program product in accordance with claim 11, wherein providing an identification of a customization comprises an identity of the selected hyperlink.

13. The computer program product in accordance with claim 10, the method further comprising:

an act of executing the executable.

14. The computer program product in accordance with claim 13, wherein the at least one parameter is provided to the executing executable to thereby customize execution of the executing executable.

15. The computer program product in accordance with claim 10, wherein the executable is an installer application.

16. The computer program product in accordance with claim 10, wherein the at least one parameter comprises at least two parameters.

17. The computer program product in accordance with claim 10, wherein the customization is a based on a personal preference of a user of the client.

18. The computer program product in accordance with claim 10, wherein the customization is a localization customization.

19. The computer program product in accordance with claim 10, wherein the customization is based on a pre-registration of a user of the client.

20. A method for providing customization of an executable accessed from the web, the method comprising:

a client selecting a hyperlink corresponding to a customization of a customizable executable;

the client requesting the executable from a web server;

a web server receiving the request for the customizable executable from the client, the request comprising an identification of the customization;

the web server naming a copy of the executable, the name corresponding to the customization to be applied to the executable copy, and the name comprising at least one parameter which will be applied to the executable upon execution at the client;

the web server sending the named executable instance to the client;

the client receiving the requested executable copy and the name from the web server;

the client interpreting the name of the requested executable copy;

using the interpretation of the name to identify the at least one parameter to provide to the executable copy; and the client executing the executable copy, wherein the at least one parameter is provided to the executing executable to customize execution of the executing copy.

* * * * *